United States Patent [19]

Green

[11] 4,218,279

[45] Aug. 19, 1980

[54] BONDING METHOD EMPLOYING FILM ADHESIVES CONTAINING AN EPOXIDE RESIN

[75] Inventor: George E. Green, Stapleford, England

[73] Assignee: Ciba-Geigy Corporation, Ardsley, N.Y.

[21] Appl. No.: 919,579

[22] Filed: Jun. 27, 1978

[30] Foreign Application Priority Data

Jul. 5, 1977 [GB] United Kingdom ............... 28142/77

[51] Int. Cl.$^2$ ......................... B29C 19/02; C08F 8/18
[52] U.S. Cl. ................................. 156/272; 156/306.9; 156/330; 204/159.18; 427/53; 427/54; 428/345; 428/416; 428/415; 430/280
[58] Field of Search ....................... 156/272, 330, 309; 204/159.15, 159.18; 427/44, 207 A, 53, 386, 54; 96/115 P; 260/836, 837 R; 428/345, 416, 415

[56] References Cited

U.S. PATENT DOCUMENTS

| | | | |
|---|---|---|---|
| 3,205,157 | 9/1965 | Licari et al. | 204/159.18 |
| 3,625,744 | 12/1971 | Juna et al. | 427/53 |
| 3,708,296 | 1/1973 | Schlesinger | 204/159.23 |
| 3,929,545 | 12/1975 | van Dyck et al. | 156/272 |
| 4,058,401 | 11/1977 | Crivello | 96/115 R |
| 4,069,055 | 1/1978 | Crivello | 96/115 R |
| 4,072,592 | 2/1978 | Due et al. | 204/159.15 |
| 4,076,869 | 2/1978 | Flynn | 427/386 |
| 4,107,353 | 8/1978 | Karoly et al. | 427/54 |

FOREIGN PATENT DOCUMENTS 1516351 7/1978 United Kingdom .
1516352 7/1978 United Kingdom .
1535492 12/1978 United Kingdom .

OTHER PUBLICATIONS

Lee, H. & Neville, K., "Handbook of Epoxy Resins," ©1967, pp. 5-18.

Primary Examiner—John J. Gallagher
Attorney, Agent, or Firm—Joseph F. DiPrima; Harry Falber

[57] ABSTRACT

A layer of a liquid composition containing an epoxide resin as the sole photopolymerizable component, a heat-activated curing agent for epoxide resins, and preferably a photopolymerization catalyst, is exposed to actinic radiation until the layer solidifies to form an essentially solid, continuous film due to photopolymerization of the epoxide resin through epoxide groups, the resin remaining, however, still thermosettable by virtue of residual epoxide groups. The film so formed is sandwiched between, and in contact with, surfaces to be bonded together, and the assembly is heated to cure the epoxide resin.

12 Claims, No Drawings

BONDING METHOD EMPLOYING FILM ADHESIVES CONTAINING AN EPOXIDE RESIN

BACKGROUND OF THE INVENTION

This invention relates to the preparation of adhesives in film form, commonly called "film adhesives", containing epoxide resins, and to their use.

Structural adhesive bonding is a well established procedure in the manufacture of aircraft, and similar industries. Adhesives commonly employed for this purpose are often used in the form of solid films, thereby eliminating difficulties which may occur when a liquid adhesive is used, such as evaporation of a solvent, loss of adhesive from the required site, and uneven distribution. Epoxide resins have a high reputation as adhesives and are often required in film form.

Conventionally, film adhesives are prepared by a technique involving evaporation of a solvent or by extrusion. In the former method, a resin composition is dissolved in a volatile solvent and the solution is poured onto a flat surface: the solvent is then allowed or caused to evaporate, leaving a film of the composition. In the latter method, the resin composition is heated to its melting point, extruded through a narrow slit, and then cooled or allowed to cool. While one or other of these methods is suitable for making a film adhesive from many kinds of resin, they are unsuitable for making a film adhesive out of an epoxide resin which is both substantially insoluble in volatile solvents and not readily fusible, such as one in the B-stage or an advanced resin of very high molecular weight. They are also unsuitable for use with compositions in which a latent curing effect is achieved by using discrete particles of a solid epoxide resin and discrete particles of a solid hardener, the resin and hardener not reacting together whilst the components are in particulate form but starting to cure as soon as the components are brought into intimate contact by being dissolved in a solvent or by being fused together. Extrusion methods also suffer from the disadvantage that the advancement of the resin which may result can shorten the shelf-life of the film and lead to the premature gelation of the resin composition. Use of solvents may introduce problems of toxicity, flammability, or pollution.

A method has now been found by which a film adhesive may be prepared from an epoxide resin without causing excessive advancement of that resin; the shelf-life of the film adhesive is thus dependent only upon the nature of the resin and hardener and not upon the mode of its manufacture.

Detailed Disclosure

In this novel method, a liquid composition containing an epoxide resin is photopolymerised to form an essentially solid continuous film by exposure to actinic radiation, optionally in the presence of a catalyst for the photopolymerisation, but without thermally crosslinking it; the film so obtained is then used to bond surfaces together by the application of heat and, if desired, pressure. The period of heating can be very short, as there need be no solvent to evaporate and the films need not be thick, typically 20 to 250 μm.

The present invention accordingly provides a method for bonding two surfaces together which comprises (i) exposing to actinic radiation a layer of a liquid composition containing an epoxide resin as the sole photopolymerisable component and a heat-activated curing agent for epoxide resins, and preferably a catalyst for the photopolymerisation, until the said composition solidifies to form an essentially solid continuous film due to photopolymerisation of the epoxide resin through epoxide groups thereof but which epoxide resin remains substantially in the thermosettable state, and (ii) sandwiching between, and in contact with, the two surfaces the film so formed and heating the assembly to cure the epoxide resin.

There are also provided articles having surfaces bonded by the method of this invention.

Compositions used to prepare the films of the present invention must be liquid under the conditions employed in making these films but they are preferably solvent-free.

Epoxide resins, i.e., substances containing more than one 1,2-epoxide group per average molecule, suitable for use in the present invention are preferably those containing at least one group of formula

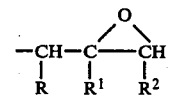

directly attached to an atom or atoms of oxygen, nitrogen, or sulphur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.

As examples of such resins may be mentioned polyglycidyl and poly(β-methylglycidyl) esters obtainable by reaction of a compound containing two or more carboxylic acid groups per molecule with epichlorohydrin, glycerol dichlorohydrin, or β-methylepichlorohydrin in the presence of an alkali. Such polyglycidyl esters may be derived from aliphatic, polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(β-merthylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)-aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, derivatives of amines such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin. N-Glycidyl compounds are not preferred when the photopolymerisation or thermal crosslinking stage involves reaction with a Lewis acid.

Examples of poly(S-glycidyl) compounds are di(S-glycidyl) derivatives of dithiols such as ethane-1,2-dithiol and bis(4-mercaptomethylphenyl) ether.

Examples of epoxide resins having groups of formula I where R and $R^2$ conjointly denote a —CH$_2$CH$_2$— group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-(glycidyloxy)-1,3-bis(5,5-dimethyl-1-glycidylhydantoin-3-yl)propane.

Epoxide resins in which some or all of the epoxide groups are not terminal may also be employed, such as vinylcyclohexene dioxide, limonene dioxide, dicyclopentadiene dioxide, 4-oxatetracyclo [6.2.1.0$^{2,7}$.0.$^{3,5}$]-undec-9-yl glycidyl ether, the bis(4-oxatetracyclo [6.2.1.0$^{2,7}$.0.$^{3,5}$]undec-9-yl) ether of ethylene glycol, 3,4-epoxycyclohexylmethyl 3',4'-epoxy-cyclohexanecarboxylate and its 6,6'-dimethyl derivative, ethylene glycol bis(3,4-epoxycyclohexanecarboxylate), 3-(3,4-epoxycyclohexyl)-8,9-epoxy-2,4-dioxaspiro [5,5] undecane, and epoxidised butadienes or copolymers of butadiene with ethylenic compounds such as styrene and vinyl acetate.

If desired, a mixture of epoxide resins may be used.

Especially preferred epoxide resins, which may have been advanced, used in the process of this invention are diglycidyl ethers of dihydric phenols such as 2,2,-bis(4-hydroxyphenyl)propane and bis(4-hydroxyphenyl)methane and of dihydric alcohols such as butane-1,4-diol, and N,N'-diglycidyl derivatives of hydantoins, such as 1,3-diglycidyl-5,5-dimethylhydantoin.

The thermally-activated crosslinking agent for the epoxide resin may be, for example, a polycarboxylic acid anhydride, dicyandiamide, a complex of boron trifluoride or boron trichloride with e.g., an amine, such as a primary amine (ethylamine, for example), or a tertiary amine (n-octyldimethylamine or trimethylamine, for example), a latent boron difluoride chelate, an imidazole, such as 2-ethyl-4-methylimidazole or 2-phenylimidazole, or an aromatic polyamine, such as bis(4-aminophenyl)-methane. Dicyandiamide and the complexes of boron trifluoride or boron trichloride with amines are preferred, since they are effective in only small proportions. The thermally-activated crosslinking agent is usually dissolved or suspended in the liquid composition before impregnation of the fibrous reinforcement.

Photopolymerisation catalysts suitable for use in the methods of this invention include o-alkylnitrobenzenes, organohalogen compounds, certain chromates and dichromates, and aromatic 'onium' salts, particularly diazonium salts, which liberate a Lewis acid on exposure to actinic radiation.

Suitable aryl diazonium compounds include the fluoroborates of formula II and III

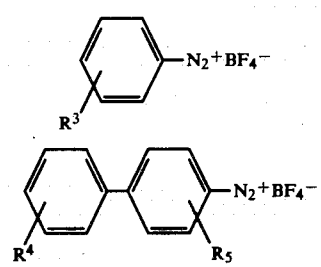

where $R^3$, $R^4$, and $R^5$ each independently represent a hydrogen or a halogen atom or an alkyl, alkoxy, aryl, nitro, or sulphonyl group. Such fluoroborates, and their use in the photoinduced polymerisation of epoxides, are described in U.S. Pat. No. 3,205,157.

Other aryl diazonium fluoroborates which are commercially available and which may be used are of formula

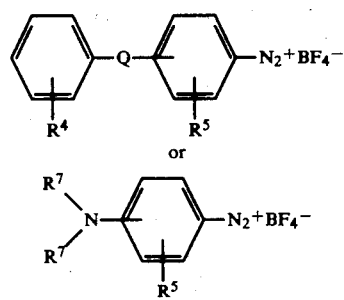

where
$R^4$ and $R^5$ are as hereinbefore defined,
Q represents an oxygen or sulphur atom or an imino (—NH—) group, and
$R^6$ and $R^7$ individually represent an alkyl group or, together with the nitrogen atom to which they are attached, represent a saturated or unsaturated 5- or 6-membered heterocyclic residue which may contain an oxygen or sulphur atom or a second nitrogen atom.

Specific suitable diazonium fluoroborates are diphenylamine-4-diazonium fluoroborate, 2,5-diethoxy-4-morpholinobenzenediazonium fluoroborate, 2,5-diethoxy-4-(p-tolylthio)benzenediazonium fluoroborate, 4-(diethylamino)benzenediazonium fluoroborate, 3-methoxy-4-pyrrolidinobenzenediazonium fluoroborate, and 4-morpholinobenzenediazonium fluoroborate.

Yet other suitable aryl diazonium compounds are those of formula

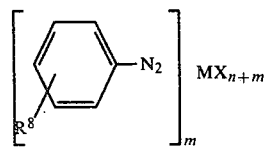

where
- $R^8$ represents a halogen atom or a nitro, N-morpholino, alkyl, alkoxy, aryl, amino, arylamino, alkylamino, or arylmercapto group,
- n is the oxidation state of M,
- m is the number of diazonium groups in the diazonium salt, and
- $MX_{n+m}$ represents hexachlorostannate, tetrachloroferrate, hexafluorophosphate, hexafluoroarsenate, hexachloroantimonate, hexafluoroantimonate, or pentachlorobismuthate.

These compounds, and their use for photopolymerising epoxides, are described in British patent specification No. 1,321,263.

Suitable other aromatic 'onium salts which liberate a Lewis acid on exposure to actinic radiation are aromatic salts of groups VA and VIA elements of the Periodic Table, such as aromatic ammonium, arsonium, phosphonium, sulphonium, and selenonium tetrafluoroborates and hexafluorophosphates, and aromatic halogenonium salts such as aromatic iodonium tetrafluoroborates, hexafluorophosphates, hexafluoroantimonates, hexachloroantimonates, tetrachlorostannates, tetrachloroferrates, pentachlorobismuthates, hydrogen sulphates, nitrates, and hexafluoroarsenates. The preferred aromatic groups are phenacyl and phenyl groups. A specific example of such an 'onium salt is bis(3-nitrophenyl)iodonium hexafluoroarsenate.

Such compounds, and their use for photopolymerising epoxides, are described in Belgian patent specifications Nos. 828 668, 828 669, and 828 670.

In each of the three aforesaid Belgian Patent Specifications it is stated that the compositions may be cured by radiation such as ultraviolet light, by heat, or by a combination of both, since the curing agent may be activated by radiation or by heat. There is no disclosure, however, of the use of the 'onium salt together with another, heat-curing agent. Each states that the curable compositions can be used as adhesives, and each has an Example describing the production of a glass laminate. In the production of these laminates, the curable composition is applied to a glass plate, another glass plate is placed on top of the first, and the assembly is exposed to ultraviolet radiation to cure the adhesive.

None of these Specifications, however, discloses exposing the compositions to ultraviolet radiation to solidify them whilst leaving them still curable by heat.

Other suitable 'onium salts are sulphonium or iodonium salts of a sulphonic acid such as those described in West German Offenlegungsschrift 2 731 396. These salts may be of the formula

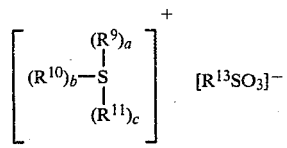

or

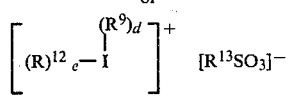

where
- $R^9$ is a monovalent aromatic organic group,
- $R^{10}$ is a monovalent alkyl, cycloalkyl, or substituted alkyl group,
- $R^{11}$ is an aliphatic or aromatic residue forming with the indicated sulphur atom a heterocyclic structure, which may contain a condensed ring,
- $R^{12}$ is a divalent aromatic residue,
- a is zero or an integer of 1 to 3,
- b is zero, 1, or 2,
- c is zero or 1, such that a+b+c is 3,
- d is zero or 2,
- e is zero or 1, such that one, but not both, of d and e is zero, and
- $R^{13}$ is an aromatic hydrocarbon residue of 6 to 13 carbon atoms (such as a phenyl, a tolyl, or a xylyl group), which may be substituted by halogen atoms (such as a chlorophenyl group), an alkyl group of 1 to 8 carbon atoms (such as a methyl, ethyl, or n-propyl group), which may be substituted by halogen atoms (such as a trifluoromethyl group), or is a fluorine atom.

Specific examples of such sulphonium salts are triphenylsulphonium fluorosulphonate, triphenylsulphonium trifluoromethanesulphonate, and triphenylsulphonium toluene-p-sulphonate. Specific examples of iodonium salts are diphenyliodonium trifluoromethanesulphonate and its fluorosulphonate. According to the above-mentioned Offenlegungsschrift, epoxide resins may be cured by exposure to ultraviolet radiation in the presence of these sulphonium or iodonium salts, followed by thermal treatment by temperatures up to 149° C. It is stated that the compositions can be used, inter alia, as adhesives, and may be applied to various substrates. Although it explicitly discloses ultraviolet exposure followed by heating to complete cure, it is not suggested that the compositions can be solidified by exposure to ultraviolet radiation and subsequently thermally cured. Indeed, the disclosures suggest that the exposure to ultraviolet radiation merely acts to release the sulphonic acid and that it is necessary to heat the composition to solidify it.

Suitable o-alkylnitrobenzenes are those of formula

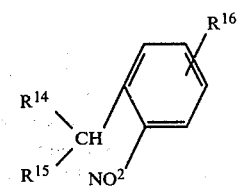

where
$R^{14}$ and $R^{15}$ each represent a hydrogen atom or an alkyl, aryl, carbalkoxy, pyridyl, carbazolyl, N- oxidopyridyl, nitroalkyl, nitroaryl, alkaryl, aralkyl, haloalkyl, or haloaryl group, and $R^{16}$ represents a hydrogen atom or an alkyl, aryl, nitroalkyl, nitroaryl, alkaryl, haloalkyl, or haloaryl group.

Such nitrobenzenes and their use for photopolymerising epoxides are described in West German Offenlegungsschrift No. 2 361 141.

Mixtures of an organohalogen compound containing alkyl, aryl, alkaryl, aralkyl, alkoxy, or aryloxy groups, and an organometalloidal compound of formula $$(R^{17})_3E \qquad X$$

where

E represents a phosphorus, antimony, arsenic, or bismuth atom and each $R^{17}$ represents a hydrogen atom or hydrocarbon group, such that at least one group $R^{17}$ is a hydrocarbon group, e.g., a mixture of iodoform and triphenylbismuthine, are described in U.S. Pat. No. 3,895,954, as is their use for photopolymerising epoxides.

Use of an alkali metal, alkaline earth metal or ammonium chromate or dichromate, or a polyhalogenated organic compound that yields a halogen-free radical at a relatively low bond dissociation energy, such as iodoform, carbon tetrabromide, tetrabromo-o-cresol, a tetrachlorobenzene, a tetrabromobutane, or carbon tetrachloride, for the photopolymerisation of epoxides is described in U.S. Pat. No. 3,782,952.

The amount of photopolymerisation catalyst is generally from 0.1 to 20 parts by weight per 100 parts by weight of the epoxide resin, 1 to 10 parts by weight being preferred. The amount of heat-activated curing agent is generally from 0.5 to 20 parts by weight, and preferably 1 to 10 parts by weight, per 100 parts by weight of the epoxide resin.

In the photopolymerising step actinic radiation of wavelength from 200 to 600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure will depend upon a variety of factors which include, for example, the individual epoxide resin used, the type of light source, and its distance from the film material. Suitable times may be readily determined by those familiar with photopolymerisation techniques, but the product so photopolymerised must still be curable by heating. Of course, irradiation is carried out at a temperature below that at which substantial heat-curing would occur.

The temperatures and duration of heating required for the thermal curing, i.e., for bonding the two surfaces together, and the proportions of heat-activated curing agent are readily found by routine experimentation and easily derivable from what is already well known concerning the heat-curing of epoxide resins.

The film may be provided with a strippable backing sheet, e.g., of a polyolefin or a polyester, or of cellulosic paper having a coating of a silicone as release agent, which is removed before the film is sandwiched between the surfaces to be bonded. Manipulation of the assembly is often easier if the film has a tacky surface. This may be produced by coating the film with a substance which is tacky at room temperature but which cures to a hard, insoluble, infusible resin under the conditions of heat employed to cure the epoxide resin component of the film. However, an adequate degree of tackiness often exists without additional treatment, especially if the epoxide resin in the film is not too far advanced. Suitable adherends include metals such as aluminum and stainless steel, glass, ceramics, and wood.

The following Examples illustrate the invention. Temperatures are in degrees Celsius and, unless otherwise indicated, parts are by weight. Epoxide contents were determined by titration against a 0.1 N solution of perchloric acid in glacial acetic acid in the presence of excess of tetramethylammonium bromide, crystal violet being used as the indicator. All lap shear strengths are quoted are the mean of three results and were determined by British Ministry of Aviation, Aircraft Materials Specification DTD 5577, November 1965.

EXAMPLE 1

A mixture of 100 parts of bisphenol A diglycidyl ether (epoxy value 5.3 equiv./kg), 5 parts of diphenylamine-4-diazonium fluoroborate and 3 parts of dicyandiamide was blended on a triple roll mill. This flowable composition was used to make a film by coating siliconised paper with it (36 μm thick) and irradiating for 1 minute with a 400 w high pressure metal halide quartz arc lamp providing radiation primarily in the 365 nm waveband.

The film was peeled off the paper, cut to size, and sandwiched between two "Alclad 3L 73" aluminium alloy sheets that had been degreased in trichloroethylene and pickled in chromic acid solution ("Alclad" is a Registered Trade Mark). Overlap joints (1.27 cm) were prepared by pressing the assembly under a pressure of 340 kN/m² for 1 hour at 170°. The lap shear strength of the joint was 5,960 kN/m².

EXAMPLE 2

A liquid composition was prepared by dissolving 5 parts of diphenylamine 4-diazonium fluoroborate and 4 parts of the boron trichloride complex of n-octyldimethylamine in 100 parts of bisphenol A diglycidyl ether. This composition was used to prepare a film using the procedure described in Example 1. Overlap joints were prepared as described in Example 1 using this film. The lap shear strength was 2,400 kN/m².

EXAMPLE 3

A liquid composition was prepared by dissolving 5 parts of diphenylamine-4-diazonium fluoroborate and 5 parts of the boron trifluoride complex of monoethylamine in 100 parts of diglycidyl hexahydrophthalate. This composition was used to make a film as described in Example 1, but irradiating for 10 minutes. Overlap joints were prepared as described in Example 1, using this film. The lap shear strength was 2,390 kN/m².

EXAMPLE 4

A mixture comprising 100 parts of bisphenol A diglycidyl ether, 5 parts of the boron trichloride complex of n-octyldimethylamine, and 5 parts of bis(3-nitrophenyl)iodonium hexafluoroarsenate (prepared as described in U.S. Pat. No. 3,981,897) was used to prepare a film as described in Example 1, but irradiating for 20 seconds. Overlap joints were prepared, also as described in that Example, and the lap shear strength was 7,500 kN/m².

What is claimed is:

1. A method for bonding two surfaces together which comprises
   (i) exposing to actinic radiation a layer of a liquid composition containing an epoxide resin as the sole photopolymerisable component and a heat-activated curing agent for epoxide resins until the said composition solidifies to form a partially cured, essentially solid, self-supporting continuous film due to photopolymerisation of the epoxide resin through epoxide groups thereof but which epoxide resin remains substantially in the thermosettable state, and
   (ii) sandwiching between, and in contact with, the two surfaces the film so formed and heating the assembly to cure the resin.

2. The method of claim 1, in which the epoxide resin contains at least one group of formula

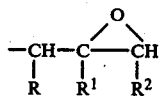

directly attached to an atom of oxygen, nitrogen, or sulfur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.

3. The method of claim 1, in which the epoxide resin is a diglycidyl ether of a dihydric phenol or of a dihydric alcohol, or a diglycidyl ester of a dicarboxylic acid.

4. The method of claim 1, in which the said heat-activated curing agent is a polycarboxylic acid anhydride, dicyandiamide, a complex of boron trifluoride or of boron trichloride, a latent boron difluoride chelate, an imidazole, or an aromatic polyamine.

5. The method of claim 1, in which the said heat-activated curing agent comprises from 0.5 to 20 parts by weight per 100 parts by weight of the epoxide resin.

6. The method of claim 1, in which the said composition also contains a photopolymerisation catalyst in an amount from 0.1 to 20 parts by weight per 100 parts by weight of the epoxide resin.

7. The method of claim 6, in which the photopolymerisation catalyst is an aromatic 'onium salt which liberates a Lewis acid on exposure to actinic radiation.

8. The method of claim 6, in which the photopolymerisation catalyst is a diazonium salt.

9. The method of claim 6, in which the photopolymerisation catalyst is of the formula

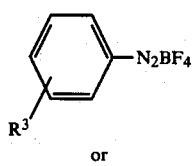

or

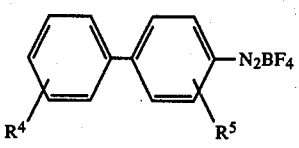

or

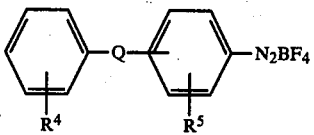

or

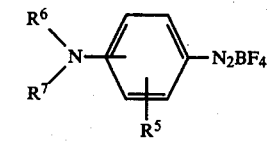

or

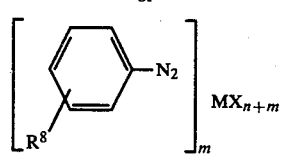

where
$R^3$, $R^4$, and $R^5$ independently each represent a hydrogen or halogen atom or an alkyl, alkoxy, aryl, nitro, or sulfonyl group, Q represents an oxygen or sulfur atom or an imino group, $R^6$ and $R^7$ individually represent an alkyl group or, together with the nitrogen atom to which they are attached, represent a saturated or unsaturated 5- or 6-membered mononuclear heterocyclic residue, a saturated or unsaturated 5- or 6-membered mononuclear heterocyclic residue also containing in the ring an oxygen atom, a saturated or unsaturated 5- and 6-membered mononuclear heterocyclic residue also containing in the ring a sulfur atom, or a saturated or unsaturated mononuclear heterocyclic residue containing in the ring a second nitrogen atom, $R^8$ represents a halogen atom or a nitro, N-morpholino, alkyl, alkoxy, aryl, amino, arylamino, alkylamino, or arylmercapto group, n is the oxidation state of M, m is the number of diazonium groups in the diazonium salt, and $MX_{n+m}$ represents hexachlorostannate, tetrachloroferrate, hexafluorophosphate, hexafluoroarsenate, hexachloroantimonate, hexafluoroantimonate, or pentachlorobismuthate.

10. The method of claim 6, in which the photopolymerisation catalyst is an aromatic halogenonium salt.

11. The method of claim 6, in which the photopolymerisation catalyst is an aromatic iodonium tetrafluoroborate, hexafluorophosphate, hexafluoroantimonate, hexachloroantimonate, tetrachlorostannate, tetrachloroferrate, pentachlorobismuthate or hexafluoroarsenate.

12. The method of claim 6, in which the photopolymerisation catalyst is a polyhalogenated organic compound that yields a halogen-free radical at a relatively low bond dissociation energy.

* * * * *